United States Patent [19]
Hirdler et al.

[11] 3,835,136

[45] Sept. 10, 1974

[54] RECOVERY OF CHLORINE AND CYANURIC ACID VALUES FROM POLYCHLOROISOCYANURIC ACID AND SALTS THEREOF

[75] Inventors: Louis C. Hirdler, Lake Charles, La.; Henry W. Schiessl, Northford; David F. Doonan, Guilford, both of Conn.

[73] Assignee: Olin Corporation, New Haven, Conn.

[22] Filed: May 22, 1973

[21] Appl. No.: 362,694

[52] U.S. Cl. .............. 260/248 A, 260/248 C, 23/85
[51] Int. Cl. ............................................ C07d 55/36
[58] Field of Search .......... 260/248 A, 248 C; 23/85

[56] References Cited
UNITED STATES PATENTS
3,222,138    12/1968    Becanne et al. ................ 260/248 X

*Primary Examiner*—John M. Ford
*Attorney, Agent, or Firm*—Donald F. Clements; T. P. O'Day

[57] ABSTRACT

A process is described for recovering chlorine and cyanuric acid values from aqueous solutions containing a chlorinated s-triazine compound selected from the group consisting of polychloroisocyanuric acids, alkali metal salts thereof and mixtures thereof. The aqueous solution of chlorinated s-triazine compound is reacted with a mineral acid to form chlorine and cyanuric acid. An inert gas is preferably passed simultaneously through the aqueous solution to remove chlorine as it forms. The chlorine-depleted aqueous slurry containing solid cyanuric acid is separated, for example, by filtration to recover cyanuric acid.

The resulting solids-free mother liquor, which contains some dissolved cyanuric acid is contacted with an adsorbent, such as activated carbon, which adsorbs the cyanuric acid from the liquid. The liquid, substantially free of chlorine and cyanuric acid values, is conveyed to waste.

Cyanuric acid adhering to the adsorbent is removed from the adsorbent with an alkali metal hydroxide or carbonate solution.

Recovered cyanuric acid values may be used in the preparation of additional polychloroisocyanuric acid or alkali metal salts thereof.

14 Claims, 1 Drawing Figure

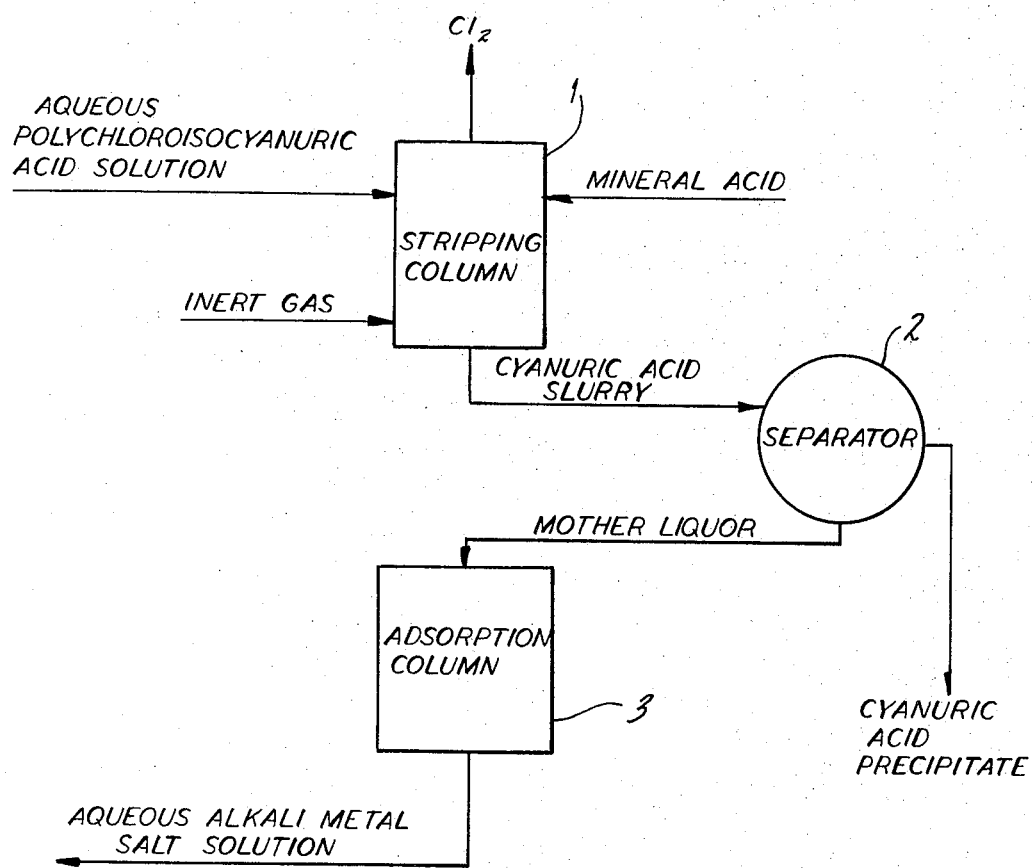

RECOVERY OF CHLORINE AND CYANURIC ACID VALUES FROM POLYCHLOROISOCYANURIC ACID AND SALTS THEREOF

This invention relates to the recovery of chlorine and cyanuric acid values from aqueous solutions of polychloroisocyanuric acids and salts thereof.

In the production of polychloroisocyanuric acids such as dichloroisocyanuric acid and trichloroisocyanuric acid, following product recovery, solutions containing varying amounts of product remain to be disposed of. In addition to containing economically valuable materials, the solutions pose a pollution problem if, for example, they are added to public waterways such as rivers and streams.

It is known to recover chlorine by the reaction of an acid with mother liquors from the production of trichloroisocyanuric acid, as shown in U.S. Pat. No. 3,222,138, issued Dec. 7, 1968 to R. L. P. Becanne et al. However, there is need for a process for the recovery of both chlorine and cyanuric acid values from aqueous solutions containing polychlorocyanuric acids and their salts.

An object of the present invention is to provide a process for the recovery of valuable materials from aqueous solutions obtained in the production of chlorinated s-triazines, alkali metal salts thereof, and mixtures thereof.

It is a further object of the invention to provide a process for recovering chlorine and cyanuric acid values from aqueous solutions of chlorinated s-triazines, alkali metal salts thereof and mixtures thereof.

These and other objects of the invention will be apparent from the following detailed description of the invention.

It has now been discovered that the foregoing objects are accomplished in a process which comprises reacting an aqueous solution containing a chlorinated s-triazine compound selected from the group consisting of polychloroisocyanuric acids, alkali metal salts and mixtures thereof, with a mineral acid to liberate gaseous chlorine and form an aqueous slurry containing solid cyanuric acid. Chlorine is separated and recovered. Solid cyanuric acid is recovered by separation from a mother liquor containing some dissolved cyanuric acid. The mother liquor is passed through an adsorption medium where the adsorbent retains the cyanuric acid present. The resulting liquid, substantially free of chlorine and cyanuric acid values is conveyed to waste. Cyanuric acid is removed from the adsorption medium by leaching with an aqueous solution of a reagent selected from the group consisting of alkali metal hydroxides and alkali metal carbonates.

The accompanying FIGURE represents a flow diagram of the process of the present invention.

In operating the process illustrated in the FIGURE, an aqueous solution containing a chlorinated s-triazine compound is added to stripping column 1. Also added to stripping column 1 is a mineral acid which reacts with the chlorinated s-triazine compound present to evolve gaseous chlorine and form cyanuric acid. In a preferred embodiment, a gas inert to the reaction conditions is charged to stripping column 1 to aid in chlorine removal. Chlorine is removed from the upper part of stripping column 1. The aqueous slurry containing solid cyanuric acid is removed from stripping column 1 and conveyed to separator 2 where the solid cyanuric acid is separated from a mother liquor containing any dissolved cyanuric acid. The solid cyanuric acid is removed from separator 2 and conveyed to storage and the mother liquor is conveyed to adsorption column 3 where it is contacted with an adsorbent. The cyanuric acid present in the mother liquor is retained by the adsorbent in adsorption column 3 and a neutral aqueous solution is removed from the bottom of adsorption column 3.

Recovery of the cyanuric acid retained by the adsorbent in adsorption column 3 can be accomplished by leaching the adsorbent (not shown) with an aqueous solution of a reagent such as an alkali metal hydroxide or alkali metal carbonate.

More in detail, one of the reactants in the process of this invention is an aqueous solution of a chlorinated s-triazine compound such as those obtained from the production of dichloroisocyanuric acid, trichloroisocyanuric acid and their alkali metal salts. The salts can be, for example, alkali metal chloroisocyanurates, such as potassium and sodium dichloroisocyanurates. While the aqueous solution treated by the process of this invention can contain any proportion of chlorinated s-triazine compound, the aqueous solution generally contains from about 0.01 to about 30 and frequently from about 0.1 to about 5 percent by weight of the chlorinated s-triazine. Often the aqueous solution also contains an alkali metal chloride such as sodium chloride. Depending upon the source of the solution, the amount of alkali metal chloride can vary widely, and can constitute, for example, from about 0 to about 25 percent by weight and preferably from about 4 to about 15 percent by weight of the aqueous solution. High concentrations (up to about 30 percent by weight) of chlorinated s-triazine compound are present in aqueous solutions containing, for example an alkali metal polychloroisocyanurate such as sodium dichloroisocyanurate. When the alkali metal polychloroisocyanurate is present in high concentrations, usually the solution contains little or no alkali metal chloride. Aqueous solutions containing chlorinated s-triazine compounds such as dichloro- or trichloroisocyanuric acid usually have concentrations of the chlorinated s-triazine of from about 0.01 to about 3 percent by weight. These solutions, however, frequently contain high concentrations of alkali metal chloride. In addition, the aqueous solution may contain trace amounts of cyanuric acid and other compounds which are often present as minor impurities in cyanuric acid, for example, ammelide and ammeline. The balance of the solution is generally water, which ranges, for example, from about 70 to about 95 and preferably from about 75 to about 95 percent by weight of the aqueous solution.

Aqueous solutions suitable for use in the process of the present invention include those by-product solutions obtained in the production of dichloroisocyanuric acid and/or trichloroisocyanuric acid. For example, in one type of process, cyanuric acid is reacted with sodium hydroxide to form disodium or trisodium cyanurate, which is then chlorinated by the addition of chlorine gas to produce a slurry containing dichloro- or trichloroisocyanuric acid. The slurry is filtered to recover the desired product, and a by-product solution containing varying concentrations of the di- or trichloroisocyanuric acid remains. U.S. Pat. Nos. 2,956,056, 2,964,525, 2,969,360, 2,975,178, 3,073,823, 3,178,429, 3,189,609 and 3,534,033 exemplify this technique for producing solutions suitable for use in the process of the present invention. Other suitable techniques for producing by-product solutions suitable for use in the process of this invention are described in U.S. Pat. Nos. 3,668,204 and 3,712,891 where cyanuric acid is reacted with hypochlorous acid or a mixture of chlorine and sodium hypochlorite to product di- and/or trichloroisocyanuric acid. Aqueous solutions containing salts of polychloroisocyanuric are also suitably used in the process of this invention and include, for example, those obtained in the processes described in U.S. Pat. Nos. 3,035,056, 3,072,654, 3,157,649, 3,270,017 and 3,501,468.

The process of this invention is particularly suitable for use in the treatment of aqueous polychloroisocyanuric acid solutions obtained from the processes disclosed in U.S. Pat. application Ser. No. 353,097, filed Apr. 20, 1973 by Henry W. Schiessl, Duane L. Sawhill and Sudhir K. Bhutani entitled "Polychloroisocyanuric Acids Prepared From A Monoalkali Metal Cyanurate", and in U.S. Pat. application Ser. No. 353,098 filed Apr. 20, 1973 by Duane L. Sawhill entitled "Polychloroisocyanuric Acids Prepared From A Monoalkali Metal Cyanurate". The disclosures of these patent applications are incorporated by reference herein.

In the process of the application of Schiessl et al. a polychloroisocyanuric acid is prepared by reacting an aqueous slurry of a monoalkali metal cyanurate, such as monosodium cyanurate with hypochlorous acid and a chlorine-containing compound selected from the group consisting of chlorine and chlorine octahydrate. In this reaction the molar ratio of the chlorine-containing compound to the alkali metal cyanurate present is at least 1:1, with an excess of chlorine-containing compound preferably being used. The reaction temperature is maintained in the range from about −5 to about 45°C. and the pH of the reaction is maintained in the range at from about 3 to about 4.5. In a preferred embodiment an excess of chlorine-containing compound is used to remove gaseous by-products such as nitrogen trichloride formed during the reaction. The resulting mixture of chlorine and gaseous by-products is then further reacted with an alkali metal hydroxide to form an alkali metal hypochlorite which is reacted with chlorine to produce hypochlorous acid, which is recycled to the chlorination reaction.

In the process described in the above-mentioned application of Sawhill, polychloroisocyanuric acid is prepared by reacting an aqueous slurry of a monoalkali metal cyanurate with an alkali metal hypochlorite and a chlorine-containing compound selected from the group consisting of chlorine and chlorine octahydrate. The molar ratio of chlorine-containing compound to the combined alkali metal present in both the alkali metal cyanurate and the alkali metal hypochlorite is at least 1:1. The reaction temperature is maintained in the range from about −5 to about 45°C. and the pH of the reaction is maintained in the range from about 3 to about 4.5. An excess of chlorine-containing compound is preferably employed to remove gaseous by-products formed during the reaction. The resulting mixture of chlorine and gaseous by-products is reacted with an alkali metal hydroxide to form an alkali metal hypochlorite which is returned to the chlorination reaction.

In the processes of the above-mentioned copending patent applications, the polychloroisocyanuric acid product is obtained as a slurry in an aqueous solution of an alkali metal chloride containing some dissolved polychloroisocyanuric acid. Upon separation of the solid product, the aqueous solution, containing dissolved polychloroisocyanuric acid and alkali metal chloride is suitable for use in the process of the present invention.

In the process of this invention, an aqueous solution of a chlorinated s-triazine compound of the type described above is acidified to release chlorine in stripping column 1. Any acid having an ionization constant larger than that of iso-cyanuric acid can be employed. However, it is preferred to use a mineral acid such as hydrochloric acid, sulfuric acid, phosphoric acid or nitric acid. A sufficient amount of mineral acid is added to react with substantially all chlorine chemically combined in the chlorinated s-triazine compound present in the aqueous solution. In general, the ratio of hydrogen atoms provided by the mineral acid to chlorine atoms in the chlorinated s-triazine compound ranges from about 1:1 to about 2:1, and preferably from about 1:1 to about 1.5:1. For example, when using a monovalent acid such as hydrochloric acid, the stoichiometric amount of acid required to release all chlorine from trichloroisocyanuric acid is a molar ratio of hydrochloric acid to trichloroisocyanuric acid of 3:1 and the stoichiometric amount of hydrochloric acid required to release chlorine from dichlorocyanuric acid is a molar ratio of hydrochloric acid to dichloroisocyanuric acid of 2:1. Similarly, using a divalent acid such as sulfuric acid, the molar ratio of $H_2SO_4$ to trichloroisocyanuric acid is 1.5:1 and the molar ratio of $H_2SO_4$ to dichloroisocyanuric acid is 1:1. Equivalent proportions of trivalent acids such as phosphoric acid are employed. In order to assure complete removal of the chlorine, it is preferred to use an excess of mineral acid above the stoichiometric amount required for the specific type of chlorinated s-triazine compound present in the aqueous solution. This excess can be, for example, a molar ratio of mineral acid to the chlorinated s-triazine compound of up to about twice the stoichiometric amount required to release the chlorine therefrom. In the process of the present invention, it is preferred to use hydrochloric acid for chlorine release in stripping column 1, as it introduces no new anionic group into the solution being reacted which must later be discarded or recovered. In order to simplify the disclosure of the invention, it will be described hereinafter in terms of hydrochloric acid. When using hydrochloric acid to release chlorine from an aqueous solution containing trichloroisocyanuric acid the molar ratio of hydrochloric acid to trichloroisocyanuric acid is the range from about 3:1 to about 6:1, and preferably from about 3:1 to about 4.5:1. Similarly, for reacting with an aqueous solution containing dichloroisocyanuric acid, a molar ratio of hydrochloric acid to dichloroisocyanuric acid in the range from about 2:1 to about 4:1, and preferably from about 2:1 to about 3:1, is employed.

In a preferred embodiment of the process of the present invention a stream of inert gas is fed to the bottom portion of stripping column 1 flowing counter-currently to the aqueous solution, to aid in chlorine removal. Any gas inert to the reaction conditions can be used, for example, air, nitrogen or carbon dioxide.

Any convenient temperature above 0°C. preferably in the range from about 20° to about 50°C. can be used in the chlorine removal step in stripping column 1. Higher temperatures can be used to aid in increasing the removal rate but are not required. It may also be desirable to apply a slight vacuum to the stripping column to aid in chlorine removal. The extent of chlorine removal can be determined by suitable analytical procedures, for example, the determination of the oxidation-reduction potential or measurement of the available chlorine content.

Upon removal of the chlorine from the acidified aqueous solution, the resulting chlorine-depleted aqueous slurry of cyanuric acid, which may contain varying amounts of alkali metal chloride, is removed from the lower portion of stripping column 1 and conveyed to separator 2. Separator 2 can be any suitable apparatus such as a rotary filter or centrifuge. The cyanuric acid is recovered and may be used, after further processing or storage, if desired, to prepare additional polychloroisocyanuric acid or alkali metal salts thereof. The liquid recovered from separator 2 is a mother liquor, an aqueous solution containing some dissolved cyanuric acid and possibly some alkali metal salt such as sodium chloride. This solution is conveyed to adsorption column 3, where it is preferably fed to the upper portion. As the mother liquor is passed through adsorption column 3, the cyanuric acid is adsorbed on an adsorbent contained in adsorption column 3. A neutral aqueous solution which may contain some dissolved alkali metal salt such as sodium chloride, is discharged from the adsorption column, which can be safely discarded as waste without harmfully polluting natural resources.

Adsorbents used in adsorption column 3 include any suitable material such as activated carbon, clay, such as bentonite or molecular sieves. Activated carbon is a preferred adsorbent.

After the adsorbent has been saturated with cyanuric acid, mother liquor is fed to a fresh adsorbent bed (not shown) and the saturated adsorbent bed is regenerated by passing an aqueous solution of a reagent, for example, an alkali metal hydroxide or carbonate, through the adsorption column to remove the cyanuric acid from the adsorbent and to form a solution containing an alkali metal cyanurate. The aqueous solution of reagent used to regenerate the adsorbent contains from about 5 to about 25 percent by weight of the alkali metal hydroxide or carbonate. It may be desirable to heat the reagent above ambient temperatures before addition to the adsorption column. A portion or all of this solution may be recycled as feed to stripping column 1. In addition, alkali metal cyanurate recovered in this manner, particularly where it is the monoalkali metal cyanurate, can be used as a starting material in the production of polychloroisocyanuric acids as described, for example, in the above-identified U.S. applications of Schiessl et al and Sawhill.

Similarly, the chlorine recovered from stripping column 1 can be used directly, for example, as a starting material in the production of polychloroisocyanuric acids. In addition, the chlorine recovered from stripping column 1 can be reacted with an alkali metal compound to form an alkali metal hypochlorite which can be further reacted with, for example, chlorine to form hypochlorous acid. Either the alkali metal hypochlorite or hypochlorous acid may likewise be used as starting materials in the production of polychloroisocyanuric acids, as described in the above-identified U.S. applications of Schiessl et al and Sawhill.

Aqueous solutions of sodium chloride which are recovered during the process may be discharged into brackish streams, or if desired, may be evaporated for use as brine feed in electrolytic cells or other uses.

The following example is presented to further illustrate the invention without any intention of being limited thereby. All parts and percentages are by weight unless otherwise specified.

EXAMPLE

In a process for the production of trichloroisocyanuric acid, 1000 parts of solution containing 9.52 parts (0.041 mole) of trichloroisocyanuric acid and 80 parts of sodium chloride in 910 parts of water was obtained as a filtrate. This solution was treated with 21 parts (0.1845 mole) of 32 percent hydrochloric acid in a stripping column. Air was passed counter-currently thru the column until all free chlorine (8.71 parts) was removed. The chlorine-containing gas was passed through a gas scrubber containing a solution of caustic soda to recover the chlorine as sodium hypochlorite.

The chlorine-free aqueous slurry containing solid cyanuric acid was filtered and 3.1 parts of solid cyanuric acid recovered. The filtrate, containing dissolved cyanuric acid was then passed through an activated carbon adsorption column where the cyanuric was adsorbed. The slightly acidic brine solution obtained from the adsorption column was neutralized and discharged to a brackish river.

The activated carbon, containing 2.19 parts of cyanuric acid, was leached with 13.6 parts of a 15 percent sodium hydroxide solution and cyanuric acid adsorbed on the carbon was recovered as 3.3 parts or trisodium cyanurate.

What is claimed is:

1. A process for the recovery of chlorine and cyanuric acid values from an aqueous solution of a chlorinated s-triazine compound selected from the group consisting of polychloroisocyanuric acids, alkali metal salts of polychloroisocyanuric acids and mixtures thereof which comprises reacting said aqueous solution of a chlorinated s-triazine compound with a mineral acid to evolve gaseous chlorine and from an aqueous slurry containing solid cyanuric acid, recovering said gaseous chlorine, separating said solid cyanuric acid from a mother liquor containing dissolved cyanuric acid and contacting said mother liquor with an adsorbent on which said cyanuric acid is adsorbed, and removing said cyanuric acid from said adsorbent by contacting said adsorbent with an aqueous solution of an alkali metal compound selected from the group consisting of alkali metal hydroxides and alkali metal carbonates.

2. The process of claim 1 wherein said aqueous solution of a chlorinated s-triazine compound contains from about 0.01 to about 30 percent by weight of said chlorinated s-triazine compound.

3. The process of claim 1 wherein said mineral acid is selected from the group consisting of hydrochloric acid, nitric acid, phosphoric acid and sulfuric acid.

4. The process of claim 3 wherein the proportion of said mineral acid is equivalent to a ratio of hydrogen atoms in said mineral acid to chlorine atoms in said chlorinated s-triazine compound of from about 1:1 to about 2:1.

5. The process of claim 1 wherein said aqueous solution of chlorinated s-triazine compound is reacted with said mineral acid in the presence of an inert gas selected from the group consisting of air, carbon dioxide and nitrogen.

6. The process of claim 1 wherein said alkali metal salt of polychloroisocyanuric acid is sodium dichloroisocyanurate.

7. The process of claim 1 wherein said polychloroisocyanuric acid is trichloroisocyanuric acid.

8. The process of claim 7 wherein said mineral acid is hydrochloric acid.

9. The process of claim 8 wherein said molar ratio of hydrochloric acid to said trichloroisocyanuric acid is from about 3:1 to about 6:1.

10. The process of claim 9 wherein said molar ratio of hydrochloric acid to said trichloroisocyanuric acid is from about 3:1 to about 4.5:1.

11. The process of claim 1 wherein said adsorbent is selected from the group consisting of activated carbon and clay.

12. The process of claim 11 wherein said adsorbent is activated carbon.

13. The process of claim 12 wherein said alkali metal compound is alkali metal hydroxide.

14. The process of claim 13 wherein said alkali metal hydroxide is sodium hydroxide.

* * * * *